US007775874B2

(12) United States Patent
Ching et al.

(10) Patent No.: US 7,775,874 B2
(45) Date of Patent: Aug. 17, 2010

(54) GAMING DEVICE HAVING A PROBABILITY ENHANCING TRIGGER SYMBOL

(75) Inventors: Erick T. Ching, Reno, NV (US); Jasonlee Kissee Hohman, Reno, NV (US)

(73) Assignee: IGT, Reno, NV (US)

( * ) Notice: Subject to any disclaimer, the term of this patent is extended or adjusted under 35 U.S.C. 154(b) by 347 days.

(21) Appl. No.: 11/419,681

(22) Filed: May 22, 2006

(65) Prior Publication Data

US 2006/0199637 A1 Sep. 7, 2006

Related U.S. Application Data

(62) Division of application No. 10/241,255, filed on Sep. 11, 2002, now Pat. No. 7,056,213.

(51) Int. Cl.
*A63F 13/00* (2006.01)
(52) U.S. Cl. ........................................................ 463/20
(58) Field of Classification Search .................... 463/20
See application file for complete search history.

(56) References Cited

U.S. PATENT DOCUMENTS

| | | | |
|---|---|---|---|
| 4,198,052 | A | 4/1980 | Gauselmann |
| 4,448,419 | A | 5/1984 | Telnaes |
| 4,838,552 | A | 6/1989 | Hagiwara |
| 4,991,848 | A | 2/1991 | Greenwood et al. |
| 5,085,436 | A | 2/1992 | Bennett |
| 5,102,134 | A | 4/1992 | Smyth |
| 5,308,065 | A | 5/1994 | Bridgeman et al. |
| 5,332,228 | A | 7/1994 | Schultz |
| 5,342,049 | A | 8/1994 | Wichinsky et al. |
| 5,393,057 | A | 2/1995 | Marnell, II |
| 5,393,061 | A | 2/1995 | Manship et al. |
| 5,407,200 | A | 4/1995 | Zalabak |

(Continued)

FOREIGN PATENT DOCUMENTS

| | | |
|---|---|---|
| AU | 564342 | 8/1987 |

(Continued)

OTHER PUBLICATIONS

Black Swan Paytable Display written by IGT, published prior to 2001.

(Continued)

*Primary Examiner*—Scott Jones
(74) *Attorney, Agent, or Firm*—K&L Gates LLP

(57) ABSTRACT

A gaming device including a award mode in a primary game that increases the probability of obtaining an award in the primary game. The gaming device includes a plurality of reels having several symbols where the symbols include award symbols, at least one trigger symbol and at least one wild symbol. The gaming device activates the reels and initiates the award mode when the trigger symbol is indicated on one of the paylines associated with the reels. In the award mode, the gaming device re-activates all of the reels except the reel including the trigger symbol until those reels indicate a wild symbol on the payline. The gaming device then re-activates the reel including the trigger symbol until an award symbol is indicated on that reel. The gaming device provides the award associated with the indicated award symbol on the payline on that reel to the player.

16 Claims, 10 Drawing Sheets

U.S. PATENT DOCUMENTS

| | | | | | |
|---|---|---|---|---|---|
| 5,423,539 | A | | 6/1995 | Nagao | |
| 5,431,408 | A | | 7/1995 | Adams | |
| 5,449,173 | A | | 9/1995 | Thomas et al. | |
| 5,542,669 | A | | 8/1996 | Charron et al. | |
| 5,560,603 | A | | 10/1996 | Seelig et al. | |
| 5,569,084 | A | | 10/1996 | Nicastro et al. | |
| 5,647,798 | A | | 7/1997 | Falciglia | |
| 5,704,835 | A | | 1/1998 | Dietz, II | |
| 5,722,891 | A | * | 3/1998 | Inoue | 463/20 |
| 5,772,506 | A | | 6/1998 | Marks et al. | |
| 5,775,692 | A | | 7/1998 | Watts et al. | |
| 5,810,361 | A | | 9/1998 | Kadlic | |
| 5,823,873 | A | | 10/1998 | Moody | |
| 5,833,537 | A | | 11/1998 | Barrie | |
| 5,855,514 | A | | 1/1999 | Kamille | |
| 5,918,880 | A | | 7/1999 | Voigt, IV et al. | |
| 5,935,002 | A | | 8/1999 | Falciglia | |
| 5,964,463 | A | | 10/1999 | Moore, Jr. | |
| 5,971,849 | A | | 10/1999 | Falciglia | |
| 5,988,638 | A | | 11/1999 | Rodesch et al. | |
| 6,003,867 | A | | 12/1999 | Rodesch et al. | |
| 6,004,207 | A | | 12/1999 | Wilson, Jr. et al. | |
| 6,012,982 | A | | 1/2000 | Piechowiak et al. | |
| 6,033,307 | A | | 3/2000 | Vancura | |
| 6,059,289 | A | | 5/2000 | Vancura | |
| 6,059,658 | A | | 5/2000 | Mangano et al. | |
| 6,089,977 | A | | 7/2000 | Bennett | |
| 6,102,400 | A | | 8/2000 | Scott et al. | |
| 6,120,031 | A | | 9/2000 | Adams | |
| 6,142,873 | A | | 11/2000 | Weiss et al. | |
| 6,142,874 | A | | 11/2000 | Kodachi et al. | |
| 6,142,875 | A | | 11/2000 | Kodachi et al. | |
| 6,155,925 | A | | 12/2000 | Giobbi et al. | |
| 6,159,095 | A | | 12/2000 | Frohm et al. | |
| 6,159,096 | A | | 12/2000 | Yoseloff | |
| 6,159,097 | A | | 12/2000 | Gura | |
| 6,173,955 | B1 | | 1/2001 | Perrie et al. | |
| 6,174,233 | B1 | | 1/2001 | Sunaga et al. | |
| 6,186,894 | B1 | | 2/2001 | Mayeroff | |
| 6,190,254 | B1 | | 2/2001 | Bennett | |
| 6,203,429 | B1 | | 3/2001 | Demar et al. | |
| 6,220,959 | B1 | | 4/2001 | Holmes, Jr. et al. | |
| 6,224,483 | B1 | | 5/2001 | Mayeroff | |
| 6,231,442 | B1 | | 5/2001 | Mayeroff | |
| 6,231,445 | B1 | | 5/2001 | Acres | |
| 6,234,897 | B1 | | 5/2001 | Frohm et al. | |
| 6,251,013 | B1 | | 6/2001 | Bennett | |
| 6,270,409 | B1 | | 8/2001 | Shuster | |
| 6,270,411 | B1 | | 8/2001 | Gura et al. | |
| 6,290,600 | B1 | | 9/2001 | Glasson | |
| 6,299,165 | B1 | | 10/2001 | Nagano | |
| 6,299,170 | B1 | | 10/2001 | Yoseloff | |
| 6,302,398 | B1 | | 10/2001 | Vecchio | |
| 6,305,686 | B1 | | 10/2001 | Perrie et al. | |
| 6,311,976 | B1 | | 11/2001 | Yoseloff et al. | |
| 6,312,334 | B1 | | 11/2001 | Yoseloff | |
| 6,315,660 | B1 | | 11/2001 | DeMar et al. | |
| 6,315,663 | B1 | | 11/2001 | Sakamoto | |
| 6,319,124 | B1 | | 11/2001 | Baerlocher et al. | |
| 6,322,078 | B1 | | 11/2001 | Adams | |
| 6,336,860 | B1 | | 1/2002 | Webb | |
| 6,340,158 | B2 | | 1/2002 | Pierce et al. | |
| 6,358,144 | B1 | | 3/2002 | Kaddlic et al. | |
| 6,364,768 | B1 | | 4/2002 | Acres et al. | |
| 6,375,570 | B1 | | 4/2002 | Poole | |
| 6,394,902 | B1 | * | 5/2002 | Glavich et al. | 463/20 |
| 6,398,218 | B1 | | 6/2002 | Vancura | |
| 6,398,644 | B1 | | 6/2002 | Perrie et al. | |
| 6,413,162 | B1 | | 7/2002 | Baerlocher et al. | |
| 6,419,579 | B1 | | 7/2002 | Bennett | |
| 6,439,943 | B1 | | 8/2002 | Aoki et al. | |
| 6,439,993 | B1 | | 8/2002 | O'Halloran | |
| 6,443,452 | B1 | | 9/2002 | Brune | |
| 6,454,266 | B1 | | 9/2002 | Breeding et al. | |
| 6,461,241 | B1 | | 10/2002 | Webb et al. | |
| 6,471,208 | B2 | | 10/2002 | Yoseloff et al. | |
| 6,481,713 | B2 | | 11/2002 | Perrie et al. | |
| 6,491,584 | B2 | | 12/2002 | Graham et al. | |
| 6,494,454 | B2 | | 12/2002 | Adams | |
| 6,537,150 | B1 | | 3/2003 | Luciano et al. | |
| 6,537,152 | B2 | | 3/2003 | Seelig et al. | |
| 6,561,904 | B2 | | 5/2003 | Locke et al. | |
| 6,565,436 | B1 | | 5/2003 | Baerlocher | |
| 6,602,137 | B2 | | 8/2003 | Kaminkow et al. | |
| 6,604,740 | B1 | | 8/2003 | Singer et al. | |
| 6,612,575 | B1 | * | 9/2003 | Cole et al. | 273/138.1 |
| 6,616,142 | B2 | | 9/2003 | Adams | |
| 6,632,139 | B1 | | 10/2003 | Baerlocher | |
| 6,632,140 | B2 | | 10/2003 | Berman et al. | |
| 6,641,477 | B1 | | 11/2003 | Dietz, II | |
| 6,702,670 | B2 | * | 3/2004 | Jasper et al. | 463/20 |
| 6,702,675 | B2 | | 3/2004 | Poole et al. | |
| 6,712,694 | B1 | | 3/2004 | Nordman | |
| 6,733,389 | B2 | | 5/2004 | Webb et al. | |
| 6,805,349 | B2 | | 10/2004 | Baerlocher et al. | |
| 6,869,360 | B2 | | 3/2005 | Marks et al. | |
| 6,905,406 | B2 | | 6/2005 | Kaminkow et al. | |
| 6,913,532 | B2 | | 7/2005 | Baerlocher et al. | |
| 6,921,335 | B2 | | 7/2005 | Rodgers et al. | |
| 7,011,581 | B2 | * | 3/2006 | Cole et al. | 463/16 |
| 7,056,213 | B2 | * | 6/2006 | Ching et al. | 463/20 |
| 7,066,814 | B2 | | 6/2006 | Glavich et al. | |
| 7,137,888 | B2 | | 11/2006 | Glavich et al. | |
| 7,169,042 | B2 | | 1/2007 | Muir et al. | |
| 7,258,611 | B2 | | 8/2007 | Bigelow, Jr. et al. | |
| 7,322,887 | B2 | | 1/2008 | Belger et al. | |
| 7,331,862 | B2 | | 2/2008 | Rodgers et al. | |
| 7,331,866 | B2 | | 2/2008 | Rodgers et al. | |
| 7,331,867 | B2 | | 2/2008 | Baerlocher et al. | |
| 7,399,225 | B2 | | 7/2008 | Kaminkow | |
| 2001/0009865 | A1 | | 7/2001 | Demar et al. | |
| 2001/0054794 | A1 | * | 12/2001 | Cole et al. | 273/138.1 |
| 2002/0010017 | A1 | | 1/2002 | Bennett | |
| 2003/0060272 | A1 | | 3/2003 | Glavich et al. | |
| 2003/0069062 | A1 | | 4/2003 | Shimizu | |
| 2003/0073483 | A1 | | 4/2003 | Glavich et al. | |
| 2003/0083121 | A1 | * | 5/2003 | Cole et al. | 463/16 |
| 2003/0162585 | A1 | | 8/2003 | Bigelow et al. | |
| 2003/0203753 | A1 | | 10/2003 | Muir et al. | |
| 2003/0216165 | A1 | * | 11/2003 | Singer et al. | 463/20 |
| 2004/0002372 | A1 | | 1/2004 | Rodgers et al. | |
| 2004/0038731 | A1 | | 2/2004 | Englman | |
| 2004/0048652 | A1 | | 3/2004 | Ching et al. | |
| 2004/0053666 | A1 | | 3/2004 | Vancura | |
| 2004/0053669 | A1 | | 3/2004 | Gerrard et al. | |
| 2004/0053672 | A1 | | 3/2004 | Baerlocher | |
| 2004/0072612 | A1 | | 4/2004 | Rodgers et al. | |
| 2004/0137982 | A1 | | 7/2004 | Cuddy et al. | |
| 2004/0147306 | A1 | | 7/2004 | Randall et al. | |
| 2004/0266516 | A1 | | 12/2004 | Thomas | |
| 2004/0266517 | A1 | | 12/2004 | Bleich et al. | |
| 2005/0049035 | A1 | | 3/2005 | Baerlocher et al. | |
| 2005/0070354 | A1 | | 3/2005 | Baerlocher et al. | |
| 2005/0233801 | A1 | | 10/2005 | Baerlocher et al. | |
| 2006/0246989 | A1 | | 11/2006 | Glavich et al. | |

FOREIGN PATENT DOCUMENTS

| | | | |
|---|---|---|---|
| AU | 564355 | | 10/1987 |
| AU | B-13331/88 | | 9/1988 |
| AU | 199717601 | B2 | 9/1997 |
| AU | 199917318 | A1 | 9/1999 |
| EP | 0 874 337 | A1 | 10/1998 |
| EP | 0 981 119 | A2 | 2/2000 |

| | | | |
|---|---|---|---|
| EP | 0984408 | A2 | 3/2000 |
| EP | 1 513 117 | A2 | 3/2005 |
| GB | 2 322 217 | A | 8/1998 |
| WO | WO 9732285 | | 9/1997 |
| WO | WO 00/32286 | | 6/2000 |
| WO | WO 00/66235 | | 11/2000 |
| WO | WO 00/76606 | A1 | 12/2000 |
| WO | WO 01/26019 | A1 | 4/2001 |
| WO | WO 2004/025584 | A2 | 3/2004 |

OTHER PUBLICATIONS

Boot Scootin Article written by Strictly Slots/Aristocrat Leisure Industries, PTY Ltd., published date unknown.
Break the Spell Advertisement written by Atronic Casino Technology, Ltd., published in 1999.
Break the Spell Article written by Strictly Slots/Atronic Casino Technology, Ltd., published in Sep. 2000.
Break the Spell Atronic Web Page, published in Jan. 2001.
Break the Spell Brochure, published in 1999.
Cash Chameleon Article written by Strictly Slots/Aristocrat Leisure Industries, PTY Ltd., published in Apr. 2001.
Catch a Wave Advertisement written by IGT, published in Dec. 2000.
Cossack Dance Advertisement written by Olympic Video Gaming, published prior to 2002.
Description of Symbol Feature in Australian UFO Gaming Machine written by Barcrest Ltd., published in 1995.
Dolphin Treasure Advertisement written by Aristocrat Leisure Industries Pty., Ltd., published in 1996.
Double Diamond Line Advertisement written by Bally Gaming Systems, published in 2000.
Enchanted Forest™ Gaming Description from Aristocrat, available in 1994.
Enchanted Unicorn Advertisement written by IGT, published in 2001.
Family Feud Bullseye advertisement, printed from www.igtonline.com/megajackpots/new_games/family_feud_bullseye_slots.html on Mar. 2, 2005 and available in 2003.
Field Testing New Slots Article, written by Strictly Slots, published in Jul. 2000.
Fishin' Buddies Article published in Strictly Slots/Anchor Games, published in Apr. 2001.
Happy Camper Advertisement written by IGT, published in 2001.
Introducing the "Smiling Ape" Machine Advertisement (including Joker's Wild Poker description) written by IGT, published prior to 2001.
Jackpot Party Brochure and Articles written by WMS Gaming, Inc, published in 1988.
Joker's Wild Advertisement written by IGT, published prior to 2001.
Little Green Men, Jr. Advertisement written by A.C. Coin and Slot Services Company, published prior to 2002.
Loco Loot Article written by Strictly Slots/Aristocrat Leisure Industries, PTY Ltd., published in May 2002.
Mountain Money Article written by Strictly Slots/Aristocrat Leisure Industries, PTY Ltd., published in Jun. 2002.
On the House Advertisement written by Olympic Video Gaming, published prior to 2002.
Penguin Pays Advertisement written by Aristocrat Incorporated, published in 1998.
Reel Magic™ Gaming Machine Description written by IGT, available in 1986.
Spin Til You Win Game Description written by IGT, published in 1996.
The Basics of Winning Video Poker (Chapter VI Deuces Wild & Chapter VII Jokers Wild) written by J. Edward Allen, published in 1990.
The Latest Buzz Article written by Bally Gaming Systems, published in Fall 2000.
Wild Bear Salmon Run Advertisement written by IGT, published in 2003.
Wild Streak Advertisement written by WMS Gaming, Inc., published in 2001.
Your Real Key to Gaming Success Advertisement (including Roll Over Beethoven and Wild Fortune) written by Olympic Video Gaming, published dated unknown.
Big Business Advertisement, written by VIDCO, available prior to May 22, 2006.
Williams Jackpot Stampede Deluxe Slot Machine Dotmation game description, written by WMS, printed from http://www.pinrepair.com/slots/wms/jackstam.htm on Jun. 30, 2009, available in 1998.
Williams Jackpot Stampede Slot Machine game description, written by WMS, printed from http://www.pinrepair.com/slots/wms/jpstamp.htm on Jun. 30, 2009, available in 1995.

* cited by examiner

| SYMBOL COMBINATION | AWARD |
|---|---|
| AAA | 10,000 |
| BBB | 1000 |
| CCC | 500 |
| DDD | 100 |
| EEE | 75 |
| FFF | 50 |
| GGG | 25 |
| HHH | 10 |
| WILD WILD WILD | 10 |
| ◇ ◇ ◇ | 5 |

FIG. 4A

| SYMBOL COMBINATION | PROBABILITY OF A SYMBOL ON REEL 1 | PROBABILITY OF A SYMBOL ON REEL 2 | PROBABILITY OF A SYMBOL ON REEL 3 | PROBABILITY TOTAL |
|---|---|---|---|---|
| AAA | 1/20 | 1/20 | 1/20 | 1/8000 |
| BBB | 1/20 | 1/20 | 1/20 | 1/8000 |
| CCC | 1/20 | 1/20 | 1/20 | 1/8000 |
| DDD | 1/20 | 1/20 | 1/20 | 1/8000 |
| EEE | 1/20 | 1/20 | 1/20 | 1/8000 |
| FFF | 1/20 | 1/20 | 1/20 | 1/8000 |
| GGG | 1/20 | 1/20 | 1/20 | 1/8000 |
| HHH | 1/20 | 1/20 | 1/20 | 1/8000 |
| WILD WILD WILD | 1/20 | 1/20 | 1/20 | 1/8000 |
| ◇ ◇ ◇ | 1/20 | 1/20 | 1/20 | 1/8000 |
| ▭ ▭ ▭ | 10/20 | 10/20 | 10/20 | 1/8 |

FIG. 4B

| SYMBOL | PROBABILITY OF THE TRIGGER SYMBOL | PROBABILITY OF A SYMBOL ON REEL 1 | PROBABILITY OF A SYMBOL ON REEL 2 | PROBABILITY OF A SYMBOL ON REEL 3 | PROBABILITY TOTAL |
|---|---|---|---|---|---|
| A | 1/20 | | 1/9 | | 1/180 |
| B | 1/20 | | 1/9 | | 1/180 |
| C | 1/20 | | 1/9 | | 1/180 |
| D | 1/20 | | 1/9 | | 1/180 |
| E | 1/20 | | 1/9 | | 1/180 |
| F | 1/20 | | 1/9 | | 1/180 |
| G | 1/20 | | 1/9 | | 1/180 |
| H | 1/20 | | 1/9 | | 1/180 |
| WILD | 1/20 | | 1/9 | | 1/180 |

GAMING DEVICE HAVING A PROBABILITY ENHANCING TRIGGER SYMBOL

PRIORITY CLAIM

This application is a divisional application of, claims priority to and the benefit of U.S. patent application Ser. No. 10/241,255, filed on Sep. 11, 2002, the entire contents of which are incorporated herein.

This application is related to the following commonly-owned co-pending patent applications "GAMING DEVICE HAVING A BONUS GAME WITH MULTIPLE PLAYER SELECTABLE AWARD OPPORTUNITIES," Ser. No. 10/237,207, "GAMING DEVICE HAVING A BONUS GAME WITH MULTIPLE PLAYER SELECTABLE AWARD OPPORTUNITIES," Ser. No. 10/660,076, "GAMING DEVICE WITH CHANGING WILD SYMBOLS," Ser. No. 10/956,303, "GAMING DEVICE HAVING FREE SPIN MODE WITH SYMBOL ELIMINATION," Serial No. 10/953,818, "GAMING DEVICE HAVING A RE-TRIGGERING SYMBOL BONUS SCHEME WITH A BONUS SYMBOL ACCUMULATOR AND PLAYER SELECTION OF ACCUMULATION TOTAL," Ser. No. 10/952,656, "GAMING DEVICE HAVING WILD INDICATORS," Ser. No. 10/982,096, "GAMING DEVICE WITH WILD ACTIVATION SYMBOLS AND WILD TERMINATION SYMBOLS." Ser. No. 10/966,223, "GAMING DEVICE HAVING A FREE SPIN GAME INCLUDING AN ACCUMULATED MODIFIER," Ser. No. 11/216,323, "GAMING DEVICE AND METHOD HAVING FREE ACTIVATION MODE AND FREE ACTIVATION MODE WITH FREE ACTIVATION RE-TRIGGER," Ser. No. 11/217,182, "GAMING DEVICE HAVING A PROBABILITY ENHANCING TRIGGER SYMBOL," Ser. No. 11/419,680, "GAMING DEVICE HAVING A FREE SPIN GAME," Ser. No. 11/459,872, "GAMING DEVICE HAVING A PROBABILITY ENHANCING TRIGGER SYMBOL," Ser. No. 11/456,016, "GAMING DEVICE INCLUDING A GAME HAVING A WILD SYMBOL RELATED AWARD," Ser. No. 11/464,347, and "GAMING DEVICE HAVING A FREE SPIN GAME," Ser. No. 11/465,734.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming device manufacturers strive to make gaming devices that provide as much enjoyment and excitement as possible. Providing a game in which a player has an opportunity to win potentially large awards or credits is one way to enhance player enjoyment and excitement.

Currently, gaming machines or devices provide games wherein a player has one or more opportunities to obtain a winning symbol combination on mechanical or video reels. The winning symbol combination may be along the same payline or on different paylines (known as a scatter pay). By providing gaming devices with more winning symbol combinations, players have more opportunities to receive an award.

In known gaming devices, however, the probability of obtaining the largest award (i.e., the jackpot award) is typically much lower than the probability of obtaining the other awards in a game. Thus, although a player may obtain more awards in a game, these awards are generally the relatively small awards and not the relatively large awards such as the jackpot award.

Many jurisdiction have regulations that prohibit changing the probability of occurrence associated with the reel symbols. This makes it more difficult to create bonus or secondary games with high payouts using the bonus game reels and reel symbols.

Gaming devices that increase the probability of obtaining the relatively large award and specifically, the jackpot award, are desirable. To increase player enjoyment and excitement, it is desirable to provide new games and gaming devices which increase the likelihood or probability that the player will obtain one or more relatively large awards in a game.

SUMMARY

The present invention is directed to a gaming device including an award mode of a primary game or bonus game where the probability of obtaining an award and specifically, a relatively large award increases when the player enters the award mode or bonus game.

In one embodiment, the gaming device includes a plurality of reels, each having a plurality of symbols. These symbols include a plurality of award symbols, at least one non-award symbol or null symbol or blank, at least one trigger symbol or symbol combination and at least one wild symbol. One or more paylines are associated with the reels to indicate symbols or symbol combinations on the reels, which are evaluated for winning symbol combinations. The symbols may be any suitable symbols such as letters, numbers, characters or any other suitable images. The award mode also includes a triggering event, which in one embodiment, includes a trigger symbol occurring on the reels. In one embodiment, the triggering event occurs when the trigger symbol is indicated on a designated reel on one of the paylines associated with the reels. In another embodiment, the triggering event occurs when the trigger symbol occurs on any of the paylines.

In a primary game, the gaming device initiates the award mode when the triggering event occurs in the game. In the award mode, the gaming device holds the reel including the trigger symbol stationary while activating or spinning the other reels until those reels indicate a wild symbol on the payline. The gaming device then holds the reels including the wild symbols stationary while reactivating or re-spinning the reel including the trigger symbol. Thus, the award mode effectively reduces the game to a single reel game where only one of the award symbols on the reel indicates a winning symbol combination in the award mode.

In the award mode, the gaming device re-activates or re-spins the reel including the trigger symbol until one of the award symbols is indicated on the payline on that reel. For instance, if a non-award or null symbol, or the trigger symbol is indicated on the payline in the award mode, the gaming device re-spins the reel until one of the award symbols or the wild symbol is indicated on the payline. The null symbols and the trigger symbol do not provide an award to the player in the award mode, but instead cause the gaming device to re-spin the reels. Therefore, the player is guaranteed to receive one of the award symbols or the wild symbol in the award mode before the award mode ends. Reducing the number of symbols that may be indicated on the payline to end the game, increases the probability that any one of the award symbols will be indicated on the payline. The gaming device then provides the award associated with the indicated award symbol or the indicated award symbol combination to the player. The award is added to the player's total award in a total award display and the bonus mode ends. In another embodiment, the player continues to re-activate the reels in the award mode if the player has spins remaining in the award mode.

The gaming device of the present invention effectively reduces the game to a single reel game or event which increases the probability or chance that a player will obtain an award in the award mode and specifically that the player will obtain a relatively large award such as jackpot award in the award mode. For example, in a three reel slot game, if each of the reels in the game includes twenty symbols including the trigger symbol, wild symbol and non-award or null symbols, the probability or chance of obtaining an award symbol combination in that game is (1/20)×(1/20)×(1/20) or 1 in 8000.

In the award mode the game is reduced to a single reel game as described above. Therefore, the probability of obtaining an award symbol (or symbol combination) in the award mode significantly increases. The probability is determined by multiplying the probability of the trigger symbol being indicated in the primary game (i.e., 1 in 20) by the probability of indicating one of the award symbols occurring in the award mode (i.e., 1 in 9). Therefore, the probability of one of the award symbols (or symbol combinations) being indicated in the game (through the award mode) is (1/20)×(1/9), which equals a probability of (1/180). Thus, it is significantly more likely that the player will obtain one of the award symbols and therefore a winning award symbol combination in game through the award mode. This increases the player's excitement and enjoyment of the game because the player has a greater opportunity or probability of obtaining the relatively large award or jackpot award in the award mode.

In one embodiment, a probability of being indicated on the payline is associated with each of the symbols on the reels. In one aspect of this embodiment, the probability associated with the trigger symbol is less than the probability associated with at least one of the award symbols, null symbols and the wild symbol on the reels. In another aspect of this embodiment, the probability associated with the trigger symbol is less than a plurality of the probabilities associated with the award symbols, null symbols and the wild symbol. In a further aspect of this embodiment, the probability associated with the trigger symbol is less than all of the probabilities associated with the award symbols, null symbols and the wild symbol in the game.

Similarly in another embodiment, the award symbols include one relatively large award and several relative small awards. In this embodiment, a probability of being indicated on the payline is associated with the award symbols such that the probability associated with the award symbol including the relatively large award is less than at least one of the probabilities associated with the award symbols including the relatively small awards being indicated on the payline. In another embodiment, the probability associated with the award symbol including the relatively large award is less than a plurality of the probabilities associated with the award symbols including the relatively small awards. In a further embodiment, the probability associated with the award symbol including the relatively large award is less than all of the probabilities associated with the award symbols including the relatively small awards.

In a further embodiment, the award mode of the present invention includes an award associated with a winning symbol combination including all wild symbols. In this embodiment, if the award mode is initiated and a wild symbol is indicated on the payline associated with the reels, in combination with the other wild symbols indicated on the payline, the gaming device provides the maximum or largest award in the game, such as the jackpot award. In another embodiment, the gaming device provides a predetermined award associated with a winning symbol combination including wild symbols in the game.

It should be appreciated that although the present application primarily discusses a trigger symbol, a combination of symbols (i.e., a trigger symbol combination) could be employed to trigger the award mode. It should also be appreciated that the trigger symbol could function as a wild symbol and one of the other reels could re-activated.

It is therefore an advantage of the present invention to provide a gaming device that provides an increase probability of obtaining awards in a game.

Another advantage of the present invention is to provide a gaming device that increases the probability of obtaining a relatively large award in a game.

It is a further advantage of the present invention to provide a gaming device that increases the probability of obtaining the jackpot award in a game.

Other objects, features and advantages of the invention will be apparent from the following detailed disclosure, taken in conjunction with the accompanying sheets of drawings, wherein like numerals refer to like parts, elements, components, steps and processes.

BRIEF DESCRIPTION OF THE DRAWINGS

FIG. 4A is probability table illustrating the probability of each of the symbols being indicated on each of the reels in a primary game.

FIG. 4B is probability table illustrating the probability of each of the symbols being indicated on each of the reels in an award mode.

DETAILED DESCRIPTION

Gaming Device and Electronics

Figure 1A:
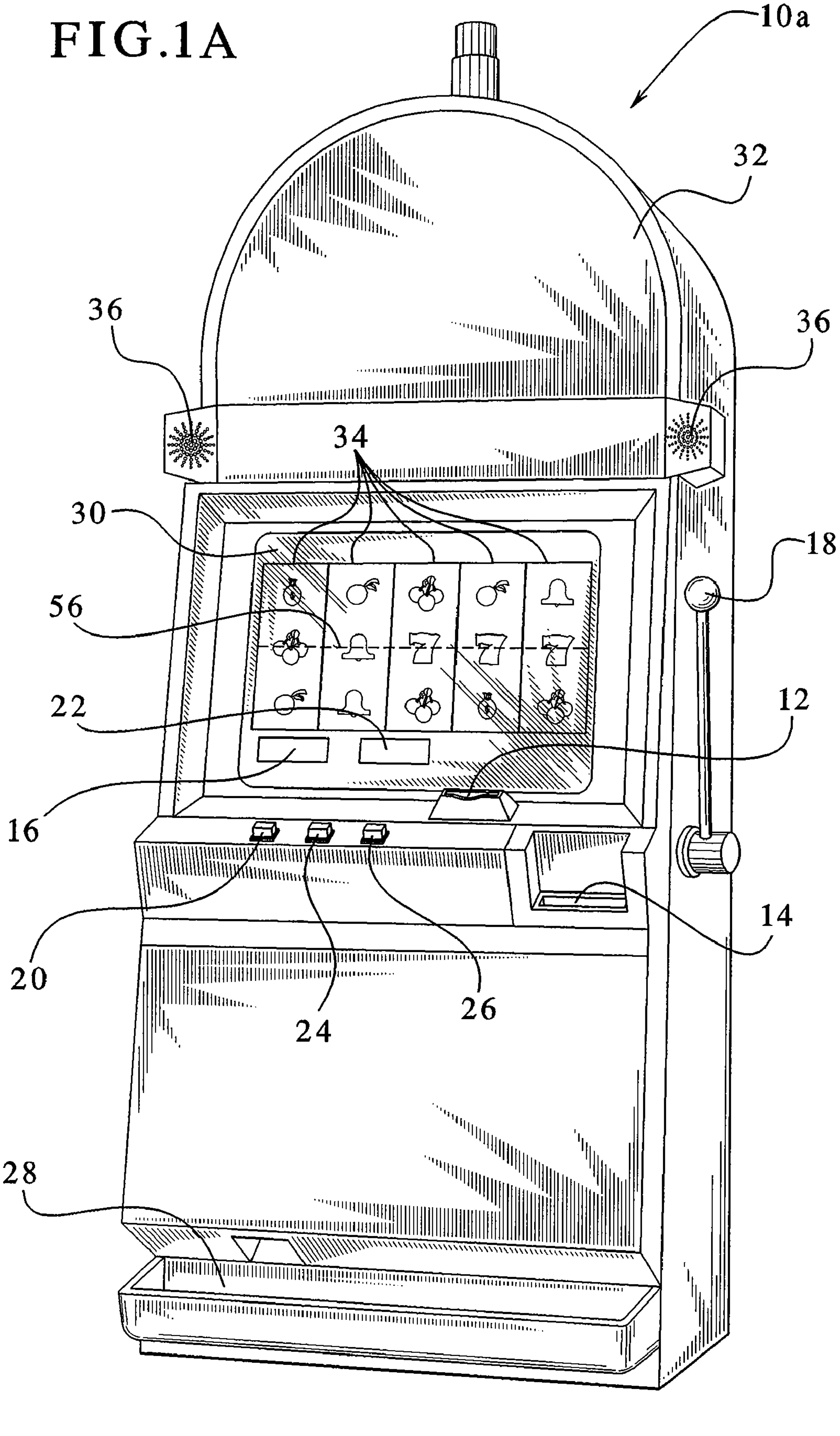
FIG. 1A is a front perspective view of one embodiment of the gaming device of the present invention.
Figure 1B:
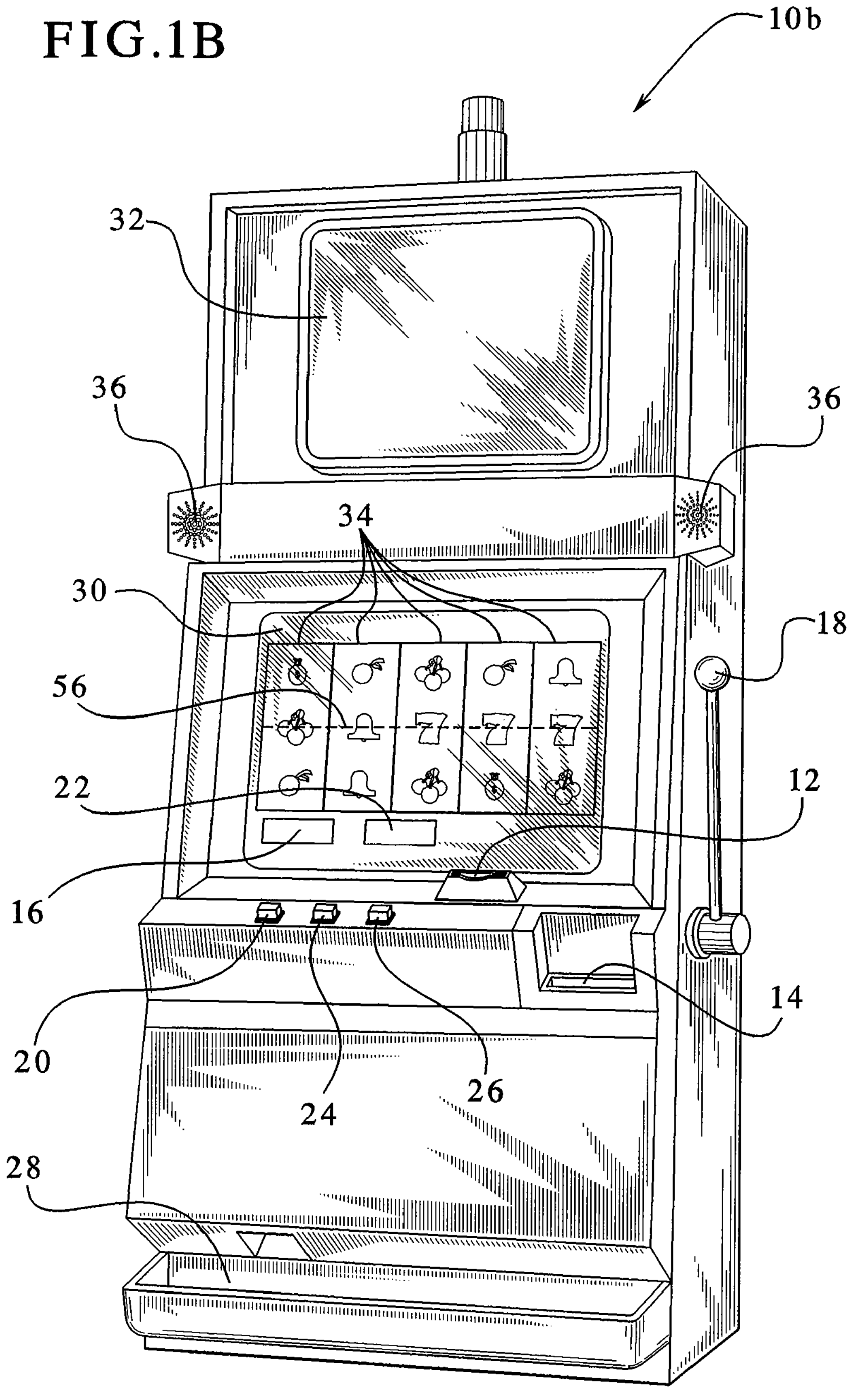
FIG. 1B is a front perspective view of another embodiment of the gaming device of the present invention.

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 is preferably a slot machine having the controls, displays and features of a conventional slot machine. It is constructed so that a player can operate it while standing or sitting, and gaming device 10 is preferably mounted on a console. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any primary game such as slot, black jack, poker or keno, any of the bonus triggering events and any of the bonus round games. The symbols and indicia used on and in gaming device 10 may be in mechanical, electrical, electronic or video form.

As illustrated in FIGS. 1A and 1B, gaming device 10 includes a coin slot 12 and bill acceptor 14 where the player inserts money, coins or tokens. The player can place coins in the coin slot 12 or paper money or ticket vouchers in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

A player may cash out and thereby receive a number of coins corresponding to the number of remaining credits by pushing a cash out button 26. When the player cashes out, the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30, and the alternative embodiment shown in FIG. 1B includes a central display device 30 as well as an upper display device 32. Gaming device 10 displays a plurality of reels 34 such as three to five reels 34 in mechanical or video form at one or more of the display devices. A display device can be any viewing surface such as glass, a video monitor or screen, a liquid crystal display or any other display mechanism. If the reels 34 are in video form, the display device for the video reels 34 is preferably a video monitor.

Each reel 34 displays a plurality of indicia such as bells, hearts, fruits, numbers, letters, bars or other images, which preferably correspond to a theme associated with the gaming device 10. Furthermore, gaming device 10 preferably includes speakers 36 for making sounds or playing music.

Figure 2:
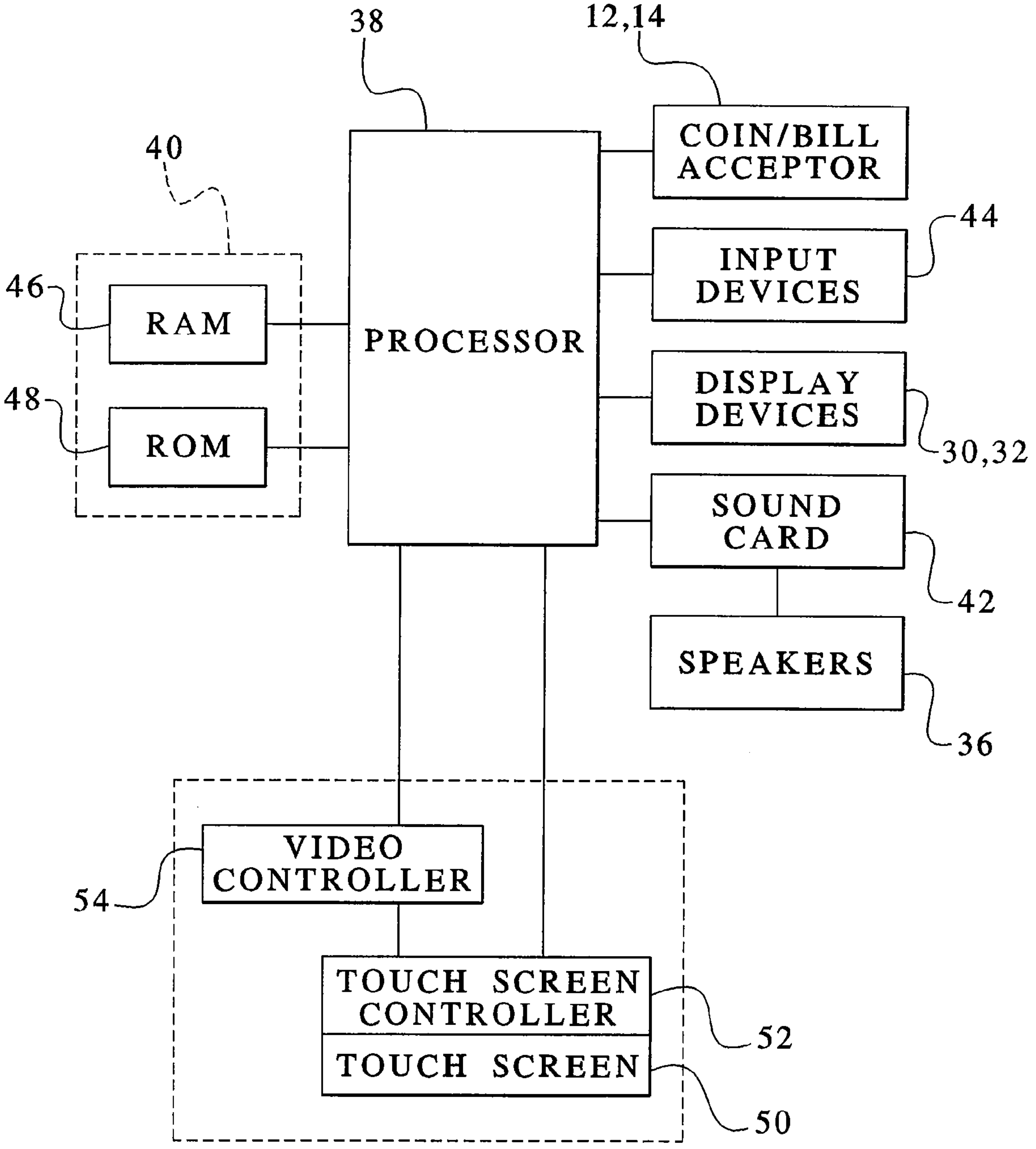
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively or alternatively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 is generally referred to herein as the "computer" or "controller."

With reference to FIGS. 1 A, 1B and 2, to operate the gaming device 10 in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, gaming device 10 also gives players the opportunity to win credits in a bonus round. This type of gaming device 10 will include a program which will automatically initiates a bonus round when the player has achieved a qualifying condition in the game. This qualifying condition can be a particular arrangement of indicia on a display device. The gaming device 10 preferably uses a video-based central display device 30 to enable the player to play the bonus round. Preferably, the qualifying condition is a predetermined combination of indicia appearing on one or more of a plurality of the reels 34. As illustrated in the five reel slot game shown in FIGS. 1A and 1B, the qualifying condition could be the number seven appearing on three adjacent reels 34 along a payline 56. It should be appreciated that the present invention can include one or more paylines, such as payline 56, wherein the paylines can be horizontal, diagonal or any combination thereof.

Probability Enhancing Trigger Symbol

Referring to FIGS. 1C, 3A, 3B, 4A and 4B, one embodiment of the reels of the present invention is illustrated where three reels are employed in a game. It should be appreciated that any suitable number of reels may be employed in the primary game. In this embodiment, each of the reels 34*a*, 34*b* and 34*c* includes symbols 100, which are represented by letters A, B, C, D, E, F, G and H, non-award or null symbols or blanks 104, at least one trigger symbol 102 and at least one wild symbol 105. It should be appreciated that any suitable number and types of symbols may be employed in a game according to the present invention. Each symbol is positioned at a reel stop position or reel stop on each of the reels. Therefore, one of the symbols such as one of the award symbols, one of the null symbols, the trigger symbol or the wild symbol will be indicated on a payline in the game.

Figures 3A, 3B:
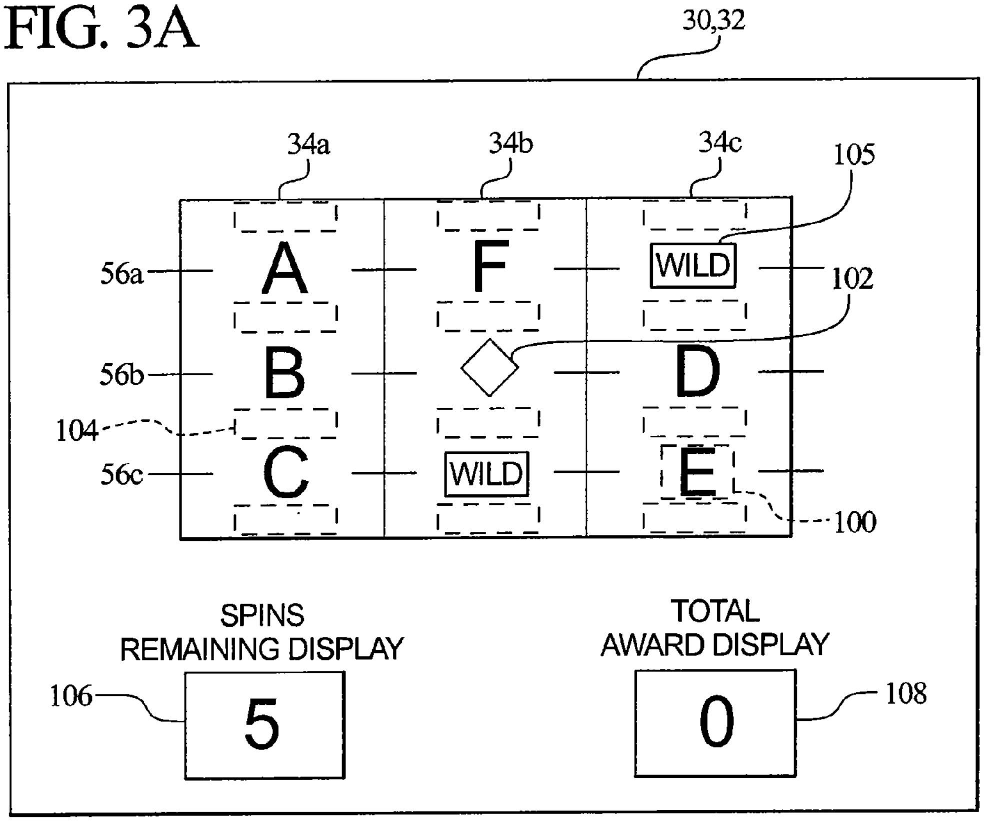
FIG. 3A is an enlarged elevation view of one of the display devices of FIGS. 1A and 1B illustrating one embodiment of the present invention.
FIG. 3B is an award table illustrating the symbol combinations and the awards associated with the symbols combinations of the embodiment of FIG. 3A.

Referring to FIG. 3A, in one embodiment the gaming device displays a plurality of reels and specifically three reels 34*a*, 34*b* and 34*c*. The reels include a plurality of symbols such as the letters A, B, C, D, E, F, G and H. The reels also include at least one trigger symbol, such as a diamond symbol 102. It should be appreciated that one or more of the reels may include at least on trigger symbol. Additionally, each of the reels includes at least one wild symbol 105 and at least one null symbol or blank 104. A probability of being indicated is associated with each of the symbols on the reels. In the primary game, the probability of each of the symbols being indicated on one of the reels is one in twenty (1/20) or 5.0% as shown in the probability table illustrated in FIG. 4A. If a triggering event occurs in the primary game, an award mode is initiated. In the award mode, the primary game is effectively reduced to a one-reel game. In addition, the null symbols 104 or blanks, and the trigger symbol, each re-spin or re-activate the reels. Thus, the effective number of symbols on the reels is reduced from twenty symbols to nine symbols, which further increases the probability that one of the symbols will be indicated on the reels. Several paylines, such as paylines 56*a*, 56*b* and 56*c* are associated with the reels. It should be appreciated that one or more paylines may be associated with the reels. A spins remaining display 106 indicates the number of spins remaining in the game. A total award display indicates the total value of the awards accumulated by the player in the game.

The gaming device provides the player with a number of spins in the game. The number of spins may be randomly determined, predetermined or determined in any suitable manner. The player uses the spins to activate or spin the reels 34*a*, 34*b* and 34*c*. The gaming device provides an award associated with one or more winning symbol combinations indicated on one of the paylines 56*a*, 56*b* or 56*c* associated with the reels. The player continues to spin the reels until the player has no spins remaining as indicated by the spins remaining display 106.

The trigger symbol or diamond symbol 102 increases the probability that the player will obtain one of the awards in the game and specifically increases the probability that the player will obtain the largest award such as the jackpot award in the game. The game preferably includes only one trigger symbol, designated as a diamond symbol 102, on one of the reels 34 in the game. In one embodiment, the middle reel 34*b*, includes the trigger symbol or diamond symbol 102. If the diamond symbol 102 is indicated on one of the paylines 56*a*, 56*b* or 56*c*, the gaming device initiates an award mode. In the award mode, the gaming device freezes or holds the reel 34*b* including the trigger symbol 102 stationary while the gaming device activates or spins the remaining reels or outside reels 34*a* and 34*c*, which are adjacent to the middle reel 34*b*. The gaming device activates or spins these reels until a wild symbol 105 is indicated on the same payline as the trigger symbol or diamond symbol 102.

Once the wild symbols 105 are indicated on reels 34*a* and 34*c* and on the same payline as the trigger symbol 102, the gaming device holds or keeps these reels stationary. The symbols on payline 56*b* are wild symbol 105*a* on reel 34*a*, trigger symbol or diamond symbol 102 on reel 34*b* and wild symbol 105*b* on reel 34*c*. The gaming device now re-spins or re-activates reel 34*b* until an award symbol such as one of the letters is indicated on payline 56*b*. Any award symbol 100 indicated on that payline will provide a symbol combination having three identical symbols matching the award symbol 100 indicated on that payline. This occurs because two of the symbols on that payline are the wild symbols 105*a* and 105*b* as illustrated in FIG. 5C. Because only the middle reel 34*b* is re-activated or re-spun during the game to determine the award, the game is reduced to a one reel or single reel game. The player now only needs to obtain one award symbol to win an award in the award mode. More specifically, the player only has to spin one reel 34*b* to obtain the largest award such as the jackpot award in the game. Thus, because the award mode reduced the game to a one reel or single reel game, the probability of obtaining any of the awards, and specifically the largest award in the game, increases significantly.

In the award mode, when the middle reel 34*b* is re-activated and the trigger symbol or diamond symbol 102 is indicated on payline 56*b*, the gaming device re-spins or re-activates reel 34*b*. Thus in one embodiment, the trigger symbol or diamond symbol does not provide an award to the player in the game. In another embodiment, an award is associated with the trigger symbol and is provided to the player if the trigger symbol is indicated on the reel after the reel is re-activated in the award mode.

Similarly, if a non-award or null symbol (i.e., blank) 104 is indicated on payline 56*b* on reel 34*b*, the gaming device re-spins or re-activates reel 34*b*. Thus, a null symbol does not provide an award to the player; rather, the reels are re-spun to give the player another opportunity to obtain one of the awards in the game. Once an award symbol 100 is indicated on the designated payline on reel 34*b*, the gaming device provides an award associated with the award combination including those symbols. If the award symbol happens to be the jackpot symbol, the player obtains three of the jackpot symbols and therefore, the jackpot award in the game. The award received by the player in the game is transferred to the total award display 108 and provided to the player when the game ends. In one embodiment, the game ends when the player obtains an award in the game. In another embodiment, the game ends when the player runs out of spins as indicated by the spins remaining display 106.

In a further embodiment, the gaming device includes a modifier such as a multiplier which changes such as by increasing when the null symbol occurs on the reel. The modifier such as the multiplier is employed in one embodiment to increase the award determined by the generated symbol on the reel.

By effectively reducing the game to a single reel or one reel game, the present invention significantly increases the probability of obtaining an award in the game without changing the random probability of occurrence. In particular, the present invention increases the probability or the likelihood that the player will obtain the largest award such as the jackpot award in the game. For example, in a typical reel-type game, a player must obtain one of a plurality of designated symbol combinations on one or more of the paylines associated with a set of reels to obtain an award in the game. The gaming device or player spins the reels and the reels randomly indicate symbols on one or more of the paylines associated with the reels. If a winning symbol combination is indicated on one of the designated winning paylines in the game, the gaming device provides an award associated with that winning symbol combination. The probability of obtaining a particular symbol combination, however, is based on the number of reels in a game and the number of symbols included on those reels. Thus, the more reels and symbols in a game, the less likely or less probable it is that the player will obtain one of the winning symbol combinations in that game.

For example, a particular game of the gaming device may include three reels, such as reels 34*a*, 34*b* and 34*c* in FIG. 3A. In this example, each of the reels includes twenty reel positions, which include nine award symbols as symbols A, B, C, D, E, F, G, and H, one wild symbol, one trigger symbol and ten null symbols. In this example, the symbols must occur or be indicated on payline 56*b* to provide a winning symbol combination in the game. Thus, at the beginning of the game each symbol has a 5 % (1/20) chance or probability of being indicated on payline 56*b* on each of the reels as illustrated in FIG. 4A. As a result, the overall probability that a particular symbol combination will occur on that payline is (1/20)×(1/20)×(1/20), which equals (1/8000) or 0.013%. Therefore, in this example, because each symbol has a 5% (1/20) chance or probability of being indicated on a single payline on the reels, the overall probability of a particular symbol combination occurring on that payline in the primary game (without the award mode) is (1/8000) or 0.013%.

Referring to FIG. 3B, an example of a payout or award table is illustrated. In this example, a winning symbol combination in the primary game includes three identical symbols. For instance, the jackpot award or largest award indicated on the table is the award of ten thousand associated with the symbol combination including three A symbols (i.e., A, A, A). The award associated with the other winning symbol combinations are also shown in the table. It should be appreciated that any suitable combination of symbols in a game may be designated as a winning symbol combination.

Referring to FIG. 4A, a probability table for a primary game or base game indicates the probability of each of the symbols being indicated on a payline for each reel in the three reel slot game shown in FIG. 3A. The table also indicates the probability of being indicated on a payline associated with each of the winning symbol combinations shown in FIG. 3B for each of the symbols on the reels and the probability of three null symbols or blanks being indicated on the payline. As illustrated in the table, the probability of each of the award symbols (i.e., A, B, C, D, E, F, G and H) being indicated on any one of the reels is (1/20). The probability of a winning symbol combination including one of the award symbols, the trigger symbol or the wild symbol, being indicated on the designated payline is (1/8000) (i.e., (1/20)×(1/20)×(1/20)). The probability of three null symbols or blanks being indicated on the payline is ((10/20)×(10/20)×(10/20)) or (1/8). Therefore, a player has a one in eight thousand chance in the primary game to obtain one of the winning symbol combinations, and specifically of obtaining the jackpot award in the game.

In the award mode of the present invention, the number of reels is effectively reduced to one reel or one active reel such as reel 34*b*. As a result, the probability of obtaining a particular symbol or a particular symbol combination increases significantly. Referring to FIG. 4B, a probability table illustrates the probabilities of each of the symbols being indicated on the reel in the award mode. Additionally, the table illustrates the probability of a winning symbol combination, which in the award mode is one award symbol, being indicated on the payline in the award mode. Because the trigger symbol and the null symbols cause the reel to re-spin in the award mode, the number of effective award symbols in the award mode is reduced to nine. Therefore, the probability of each of the award symbols or the wild symbol being indicated on the payline in the game (through the award mode) is (1/180), which is the probability of the trigger symbol being indicated on the payline in the primary game (1/20) multiplied by the probability of any one of the award symbols or the wild symbol being indicated on the payline in the award mode, which is (1/9). The probability of one of the award symbols or the wild symbol being indicated in the game (through the award mode) is therefore, (1/20)×(1/9) or (1/180) as shown in FIG. 4B. Accordingly, the overall probability of obtaining a specific symbol combination is (0.013% (1/8000)+0.56% (1/180) which equal 0.573%.

Referring to FIG. 3A, in one example of the award mode of the present invention, if a trigger symbol or diamond symbol 102 is indicated on payline 56*b* in a primary game, an award mode is initiated and the outside reels 34*a* and 34*c* are re-activated or re-spun until wild symbols are indicated on payline 56*b*. Then, the reels 34*a* and 34*c* are held stationary while the middle reel 34*b* is re-activated or re-spun until an award symbol is indicated on payline 56*b*. The probability or likelihood of obtaining a particular symbol combination on the reels has now increased because the player only has to obtain one award symbol on reel 34*b* in order to obtain an award in the game.

Figure 1C:
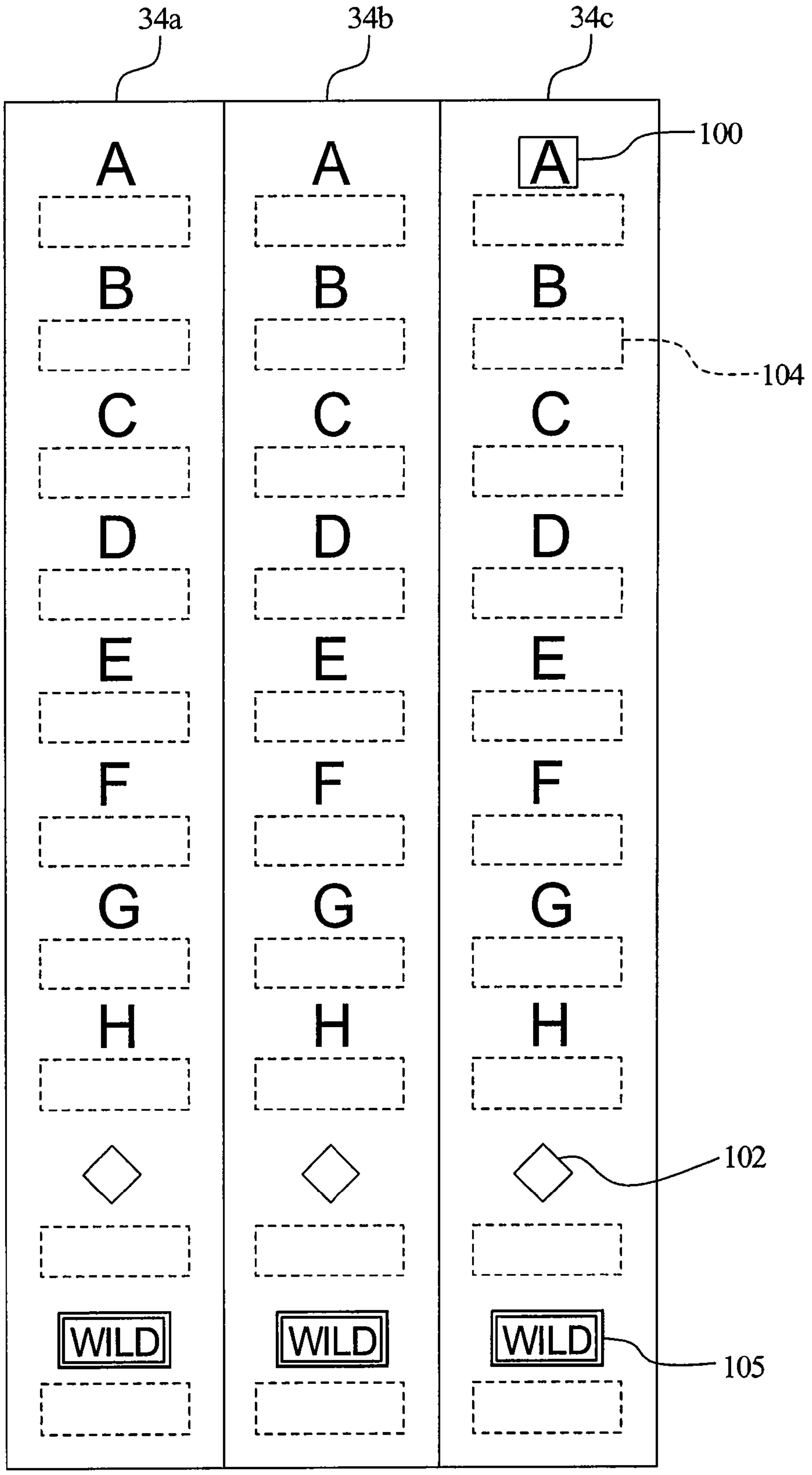
FIG. 1C is a enlarged elevation view of a set of reels and the reel stop positions included on the reels in a three reel slot game.

In this example, the middle reel 34*b* includes twenty reel positions including eight award symbols, one wild symbol, a trigger symbol or diamond symbol 102, and ten null symbols 104 as shown in FIGS. 1C and 3A. Therefore, the player initially has a one in twenty chance of obtaining the trigger symbol or diamond symbol 102 on reel 34*b* in the primary game as described above. In the award mode, if the player obtains the trigger symbol 102 or one of the null symbols 104 on payline 56*b* after the reel 34*b* is re-activated, the gaming device re-spins or re-activates reel 34*b* again until an award symbol 100 is indicated on payline 56*b*. Because the trigger symbol 102 and the null symbols 104 re-spin or re-activate the reels in the award mode, the actual number of symbols that provide an award and end the bonus mode are nine (i.e., the eight award symbols and the wild symbol). Therefore, the player has a one in nine chance of obtaining an award symbol 100 in the award mode and thereby a 11.1% chance of obtaining a winning symbol combination on payline 56*b*. As a result, the overall probability of obtaining a winning symbol combination on the reels in the award mode is determined by taking the probability of obtaining the trigger symbol or diamond symbol 102 on reel 34*b* in the initial or primary game, which is 1 in 20 (1/20), multiplied by the probability or the likelihood of one of the award symbols being indicated on payline 56*b*, which is 1 in 9 (1/9). The overall probability therefore equals (1/180) or 0.56% for obtaining any one of the winning symbol combinations on the reels in the game (through the award mode) as shown in FIG. 4B. Thus, the probability of obtaining a winning symbol combination on the reels in the primary game is 1 in 8000 or 0.013% and this probability increases to 1 in 180 or 0.56% in the award mode. This significantly increases a player's opportunities or chances of obtaining one of the awards in the game and specifically a relatively large award such as the jackpot award. This increases a player's excitement and enjoyment of the game.

Figure 5A:
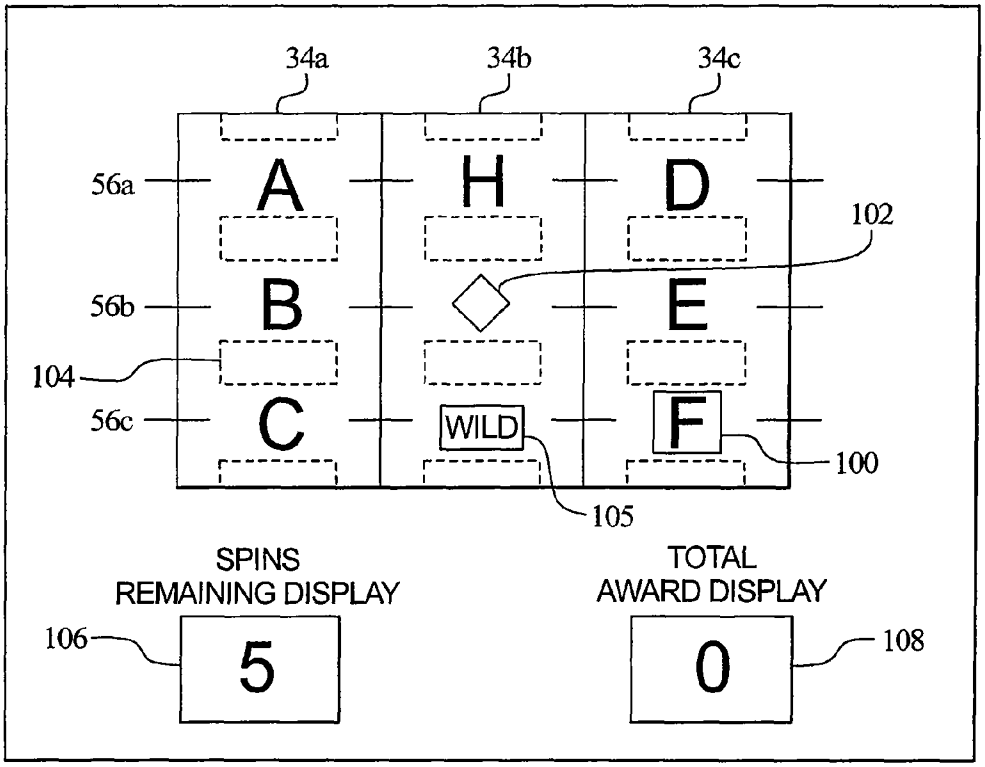
FIGS. 5A, 5B, 5C, 5D, 5E and 5F are enlarged front elevation views of an example of the embodiment shown in FIG. 3 illustrating a primary game and an award mode initiated by the occurrence of a triggering event in the primary game.
Figure 5B:
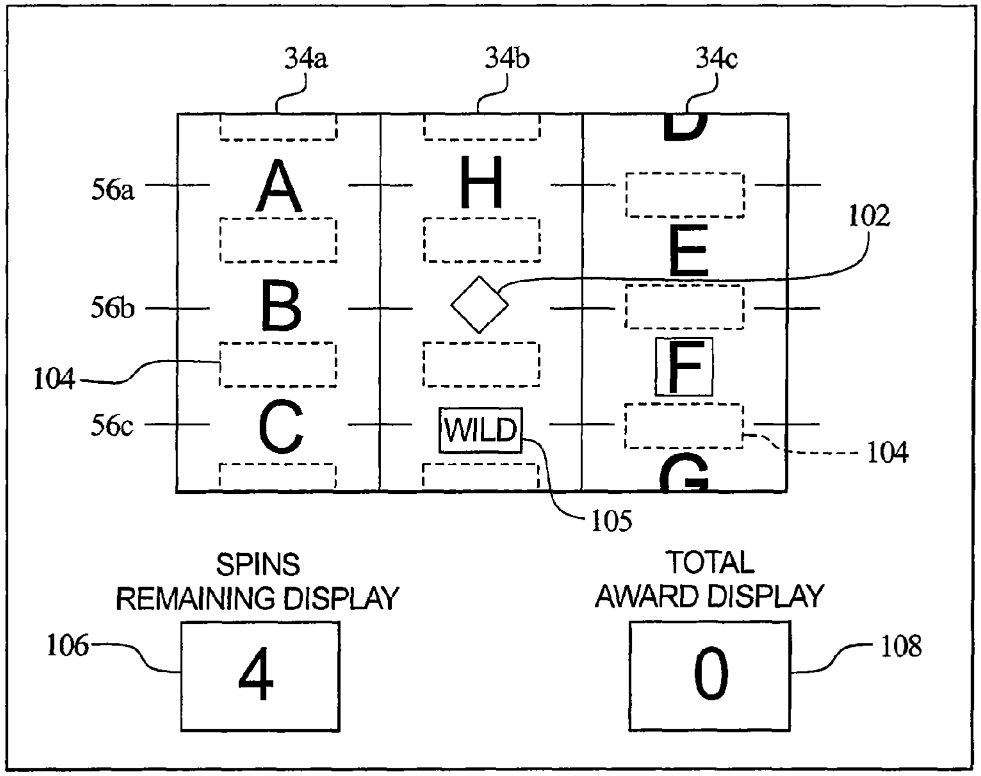
Figure 5C:
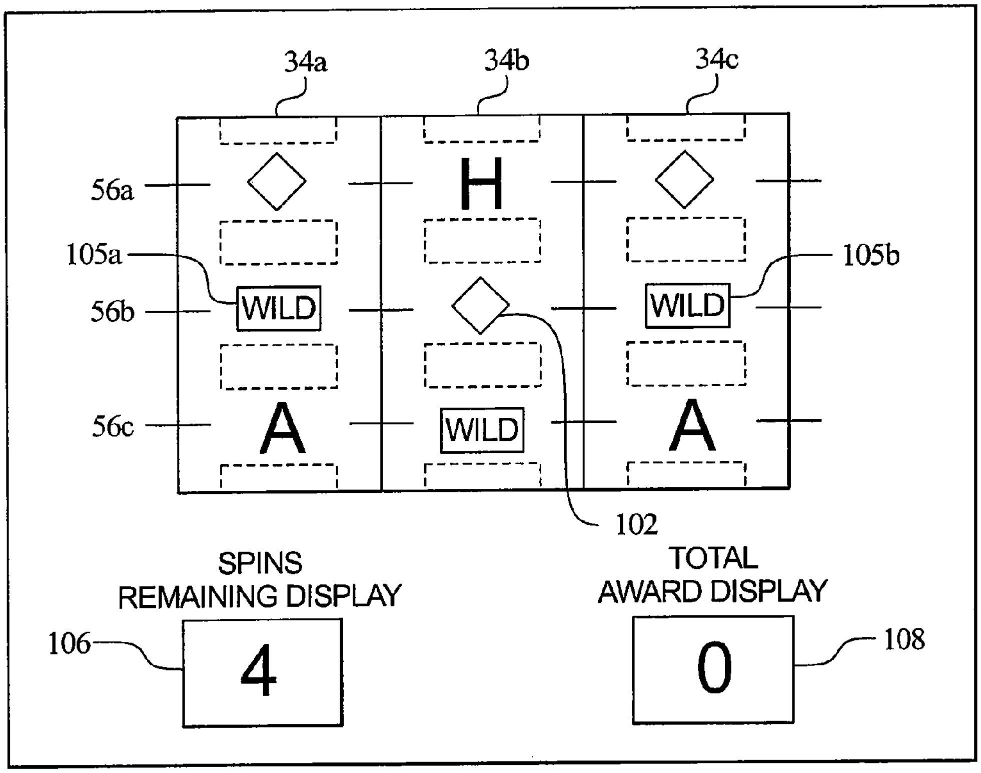

Referring to FIGS. 5A through 5F, an example of one embodiment of the present invention is illustrated where the player obtains a trigger symbol or diamond symbol 102 in the primary game or primary mode. This example includes three reels 34*a*, 34*b* and 34*c* as shown in FIG. 5A, where each reel includes a plurality of award symbols A, B, C, D, E, F, G and H, one trigger symbol designated as diamond symbol 102, one wild symbol 105 and ten null symbols 104. The player begins the game with five spins as indicated by the spins remaining display 106 as shown in FIG. 5A. Additionally, the player begins the game with an award of zero as indicated by the total award display 108. The player uses their first spin as shown in FIG. 5B to activate or spin the reels. A trigger symbol or diamond symbol 102 is indicated on payline 56*b* on reel 34*b*. The trigger symbol or diamond symbol 102 initiates the bonus mode of the present invention.

Referring to FIG. 5C, the gaming device freezes or holds reel 34b stationary while spinning or re-spinning the outside reels 34*a* and 34*c* until wild symbols 105*a* and 105*b*, respectively, are indicated on payline 56*b* on those reels. As indicated by the spins remaining display 106, the number of spins does not decrease when these reels are activated or re-activated to indicate the wild symbols. Additionally, the total award display 108 indicates that the player does not obtain an award for obtaining the trigger symbol (i.e., diamond symbol 102) or the wild symbols 105*a* or 105*b*. In another embodiment, the gaming device provides an award associated with the trigger symbol and/or the wild symbols.

Figure 5D:
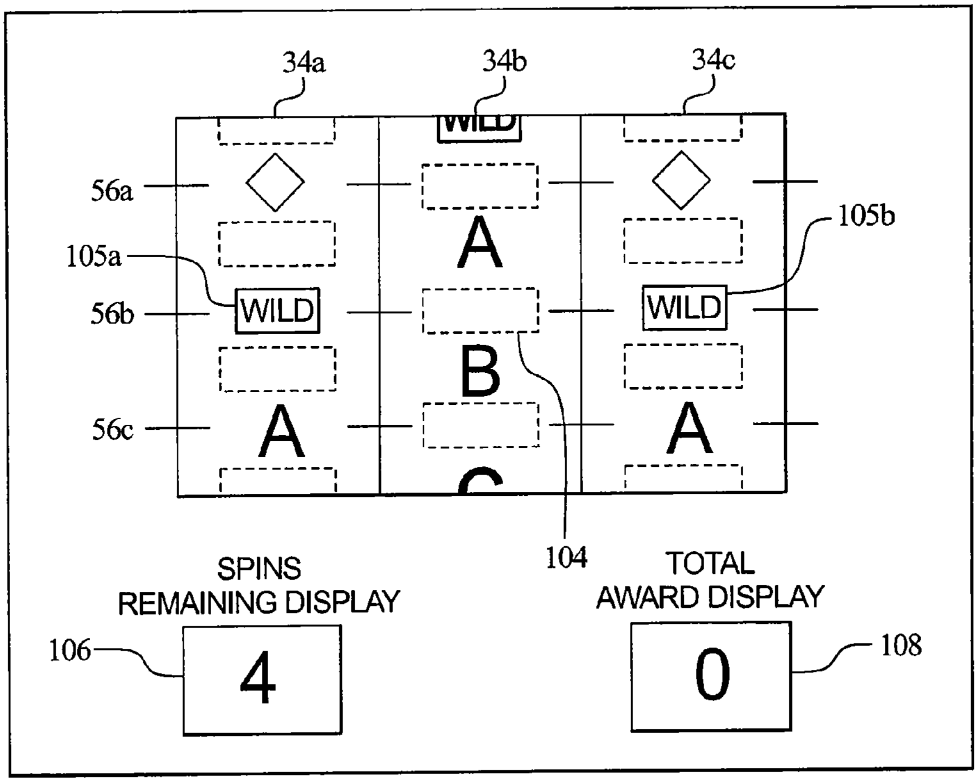

Referring to FIG. 5D, the outside reels 34*a* and 34*c* are stationary or cannot be re-activated, therefore the gaming device or player can only re-activate or re-spin reel 34*b*. In FIG. 5D the gaming device re-activates reel 34*b* and a null symbol 104 is indicated on payline 56*b*. The symbol combination of a wild symbol 105*a*, a null symbol 104 and wild symbol 105*b* on reels 34*a*, 34*b* and 34*c*, respectively, is not a winning symbol combination in the game. Therefore, the player does not receive an award for this symbol combination. However, the null symbol 104 does not end the game, but instead causes the gaming device to automatically re-spin or re-activate reel 34*b*. Thus, the null symbol 104 provides the player with another opportunity to obtain an award symbol in the game. The number of spins remaining in the award mode does not decrease as indicated by the spins remaining display 106 and the total award still remains at zero as indicated by the total award display 108.

Alternatively, as indicated above, the game upon the occurrence of the null symbol can change such as increment a modifier (such as a multiplier) which is employed to modify and preferably increase the award to the player.

Figure 5E:
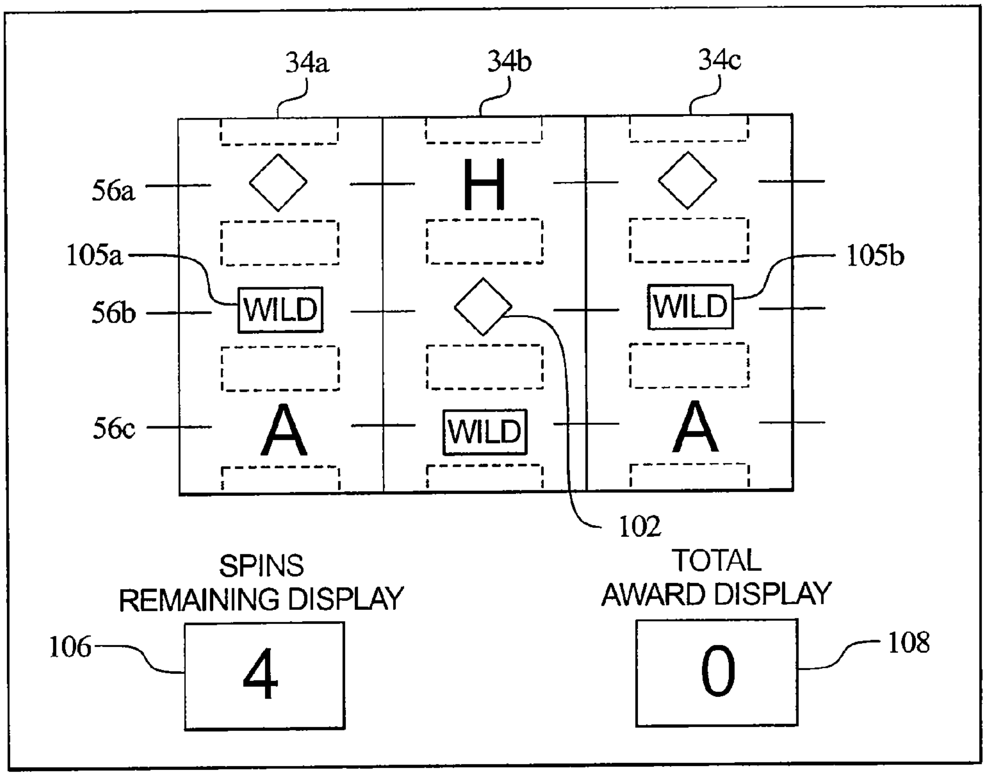

Referring to FIG. 5E, the gaming device or player re-activates reel 34*b* in the game. The trigger symbol or diamond symbol 102 is indicated on payline 56*b* on reel 34*b*. The resultant symbol combination is the wild symbol 105*a*, the trigger symbol 102 and the wild symbol 105*b*, on reels 34*a*, 34*b* and 34*c*, respectively, which is not a winning symbol combination. Similar to the null symbol 104 shown in FIG. 5D, the trigger symbol or diamond symbol 102 causes the gaming device to re-activate or re-spin reel 34*b*. Therefore, the player has another opportunity to obtain an award symbol in the game. The number of spins remaining in the bonus mode and the total award did not change in the game as indicated by the spins remaining display 106 and the total award display 108.

Figure 5F:
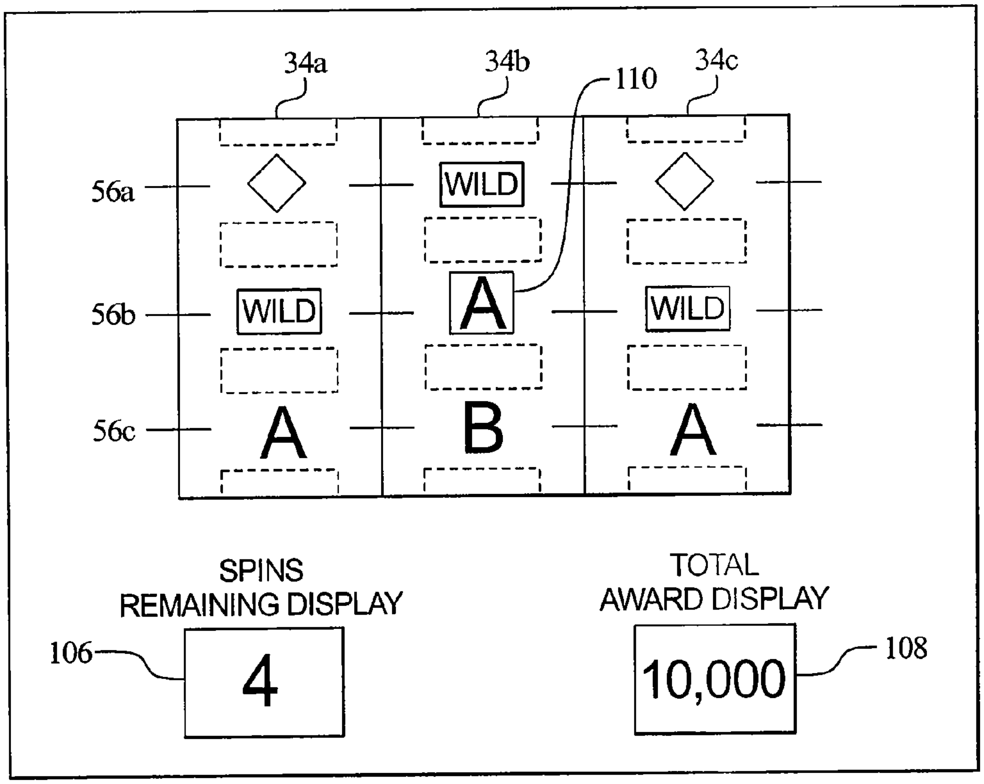

Referring to FIG. 5F, the gaming device or player re-spins and re-activates reel 34*b* in the award mode. After this spin, an award symbol designated by the letter A (110) is indicated on payline 56*b* on reel 34*b*. As a result, a winning symbol combination including wild symbol 105*a* on reel 34*a*, award symbol 110 on reel 34*b* and wild symbol 105*b* on reel 34*c* is indicated on payline 56*b*. This symbol combination provides a combination of three A symbols 110 because the wild symbols act or equal the award symbol 110. In this example, a combination including three A symbols provides the jackpot or largest award of ten thousand to the player as indicated by the total award display 108. Thus, the trigger symbol or diamond symbol 102 increases the probability or likelihood that the player will obtain an award and particularly the jackpot award in the game. The player has four spins remaining as indicated by the spins remaining display 106. In one embodiment, the player uses the remaining spins to spin the reels four more times in the award mode. In another embodiment, the game ends when the player obtains an award in the game.

Figure 6:
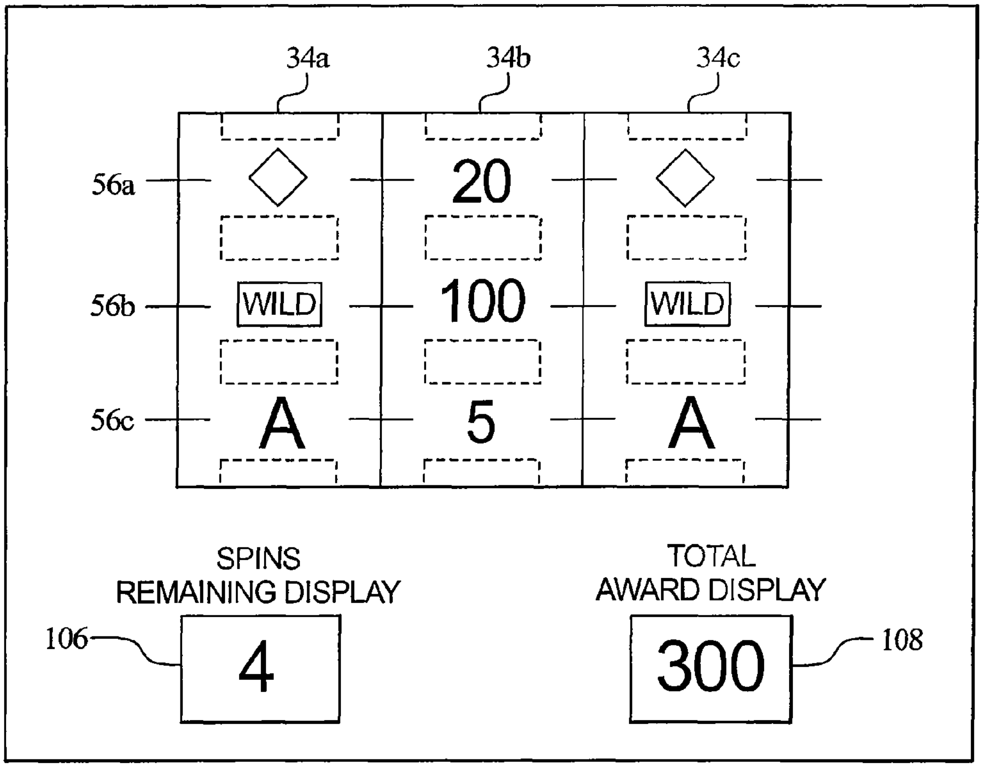
FIG. 6 is an enlarged elevation view of one of the display devices of FIGS. 1A and 1B illustrating another embodiment of the present invention.

Referring to FIG. 6, another embodiment of the present invention is illustrated where the symbols on the middle or central reel 34*b* include awards, such as the values of twenty, one hundred and five. In the award mode of this embodiment, the player re-spins or re-activates reel 34*b* until one of the award values are indicated on payline 56*b*. Instead of obtaining a winning symbol combination in the game, the player obtains three times the value of the indicated award or value on payline 56*b*. For example, in FIG. 6, the award of one hundred is indicated on payline 56*b* in the award mode. Therefore, the combination of the award of one hundred with the wild symbols 205*a* and 205*b* provide an award of three hundred because the wild symbols match the award value indicated on payline 56*b* on reel 34*b*. Thus, the player obtains an award of three hundred as indicated by the total award display 108 in the award mode. It should be appreciated that any symbols, values or any combination of symbols or values may be employed on the reels in the award mode of the game of the present invention.

Figure 7:
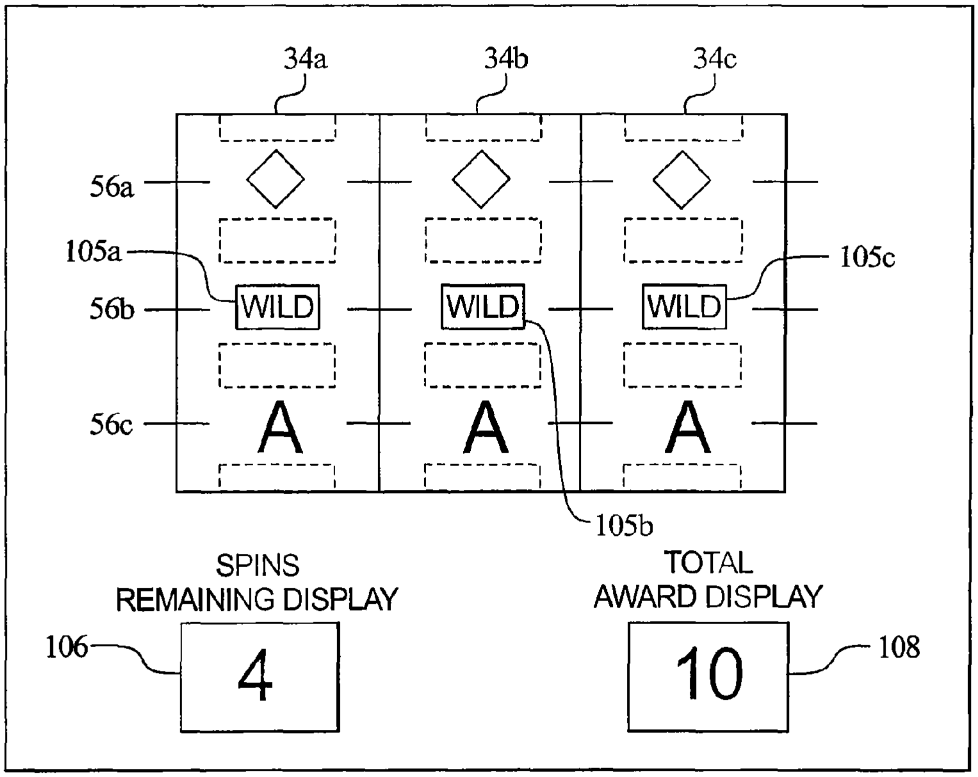
FIG. 7 is an enlarged elevation view of one of the display devices of FIGS. 1A and 1B illustrating a further embodiment of the present invention.

Referring to FIG. 7, a further embodiment of the present invention is illustrated where the middle or center reel 34*b* includes a wild symbol 105*b*. In this embodiment, the player re-spins reel 34*b* after obtaining the trigger symbol or diamond symbol 102 as described above. If the player obtains the wild symbol on payline 56*b* on reel 34*b*, the player obtains a symbol combination including three wild symbols 105*a*, 105*b* and 105*c*. Thus, the player obtains the largest award or the highest or most desirable symbol combination associated with the game such as the jackpot symbol combination because the player obtained three wild symbols on payline 56*b*. Thus, the wild symbol 105*b* increases the probability that the player will obtain the largest award such as the jackpot award in the game. In another embodiment, an award or award value is associated with the symbol combination including the wild symbol as shown in FIG. 3B.

In one alternative embodiment of the present invention, the number of spins of the reel can be limited such as to a predetermined number, a randomly determined number, or a number based on another functional game element such as the player's wager.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A gaming device comprising:

at least one display device;

at least one input device;

at least one processor; and at least one memory device which stores a plurality of instructions, which when executed by the at least one processor cause the at least one processor to operate with the at least one display device and the at least one input device to:

(a) provide a base game operable upon a wager by a player, said base game including:

(i) a plurality of reels, each of the reels including a plurality of symbols, (ii) a plurality of symbol combinations including a plurality of designated winning symbol combinations, (iii) a plurality of designated winning symbol combination awards associated with said designated winning symbol combinations, (iv) a payline associated with the reels, (v) each of the symbol combinations having a probability of being indicated on the payline; and (b) upon an occurrence of a triggering event associated with the base game, initiate an award mode without requiring any additional wager by the player and, in said award mode, modify the probabilities of each of the symbol combinations being indicated on the payline including increasing a probability of at least one of said designated winning symbol combination awards being provided to the player in said award mode, by:

(i) effectively decreasing the number of the plurality of reels which are activated in the award mode, and (ii) for each symbol associated with one of said plurality of designated winning symbol combinations, increasing a probability of said symbol being indicated on the payline in said award mode.

2. The gaming device of claim 1, wherein the number of the plurality of reels which are activated in the award mode is one.

3. A gaming device comprising:

at least one display device;

at least one input device;

at least one processor; and at least one memory device which stores a plurality of instructions, which when executed by the at least one processor cause the at least one processor to operate with the at least one display device and the at least one input device to:

(a) provide a base game operable upon a wager by a player, said base game including:

(i) a plurality of reels, each of the reels including a plurality of symbols, (ii) a plurality of symbol combinations including a plurality of designated winning symbol combinations, each of said symbol combinations formed by a number of said symbols, (iii) a plurality of awards associated with said designated winning symbol combinations, (iv) a payline associated with the reels, and (v) each of the symbol combinations having a probability of being indicated on the payline; and (b) without requiring any additional wager by the player, provide an award mode associated with the base game and, in said award mode, for at least one of said plurality of designated winning symbol combinations, increase the probability of designated winning symbol combination being indicated on the payline by effectively decreasing the number of symbols of said designated winning symbol combination which must be indicated on the reels in the award mode to provide said designated winning symbol combination.

4. The gaming device of claim 3, wherein the number of symbols of said at least one designated winning symbol combination which must be indicated on the reels in the award mode is one symbol.

5. A gaming device comprising:

at least one display device configured to display a base game including:

(i) a plurality of reels, each of the reels including a plurality of symbols, said symbols including a plurality of predefined award symbols, a trigger symbol and at least one wild symbol; and (ii) a payline associated with the reels, each of the symbols having a probability of being indicated on the payline;

at least one input device;

at least one processor; and at least one memory device which stores a plurality of instructions, which when executed by the at least one processor cause the at least one processor to operate with the at least one display device and the at least one input device to:

(a) upon a wager by a player, activate the reels and cause the reels to display a randomly generated set of symbols from the plurality of symbols on said reels, said random generation based on the probabilities of being indicated on the payline associated with each of the symbols, and (b) if the trigger symbol is indicated on the payline, initiate an award mode without requiring any additional wager by the player which includes:

(i) modifying the probability of being indicated on the payline associated with a plurality of the symbols, which includes increasing the probability of being indicated on the payline associated with each of said plurality of predefined award symbols, (ii) activating a decreased number of the plurality of reels to indicate a randomly generated one of said plurality of predefined award symbols on said payline, said random generation based on the probabilities of being indicated on the payline associated with the plurality of predefined award symbols, and (iii) providing any award associated with the indicated predefined award symbol to the player.

6. The gaming device of claim 5, wherein the award mode includes increasing the probabilities associated with the predefined award symbols by re-activating the activated reels when one or more designated symbols are indicated on the payline.

7. The gaming device of claim 5, wherein the award mode includes increasing the probabilities associated with the predefined award symbols by re-activating the activated reels when the trigger symbol is indicated on the payline.

8. A gaming device comprising:

at least one display device configured to display a base game including:

(i) a plurality of reels;

(ii) a plurality of symbols on said reels, said symbols including a plurality of award symbols, null symbols, and at least one trigger symbol;

(iii) a plurality of symbol combinations including a plurality of designated winning symbol combinations, each of said symbol combinations formed by a number of said symbols, each said plurality of designated winning symbol combination associated with one of a plurality of awards;

(iv) a payline associated with said reels; and (v) a probability of being indicated on the payline associated with each of the symbol combinations;

at least one input device;

at least one processor; and at least one memory device which stores a plurality of instructions, which when executed by the at least one processor cause the at least one processor to operate with the at least one display device and the at least one input device to:

(a) upon a wager by a player, generate a set of symbols from the plurality of symbols on the reels, and (b) if the trigger symbol is indicated on the payline, initiate, an award mode without requiring any additional wager by the player, wherein the award mode includes:

(i) for at least one of said plurality of designated winning symbol combinations, increasing the probability of said designated winning symbol combination being indicated on the payline by decreasing the number of symbols of said designated winning symbol combination which must be indicated in the award mode to provide said designated winning symbol combination, (ii) indicating at least one symbol in the award mode, and (iii) if the at least one indicated symbol provides one of said plurality of designated winning symbol combinations, providing to the player the award associated with said one of the plurality of designated winning symbol combinations.

9. A method for operating a gaming device, said method comprising:

(a) providing a base game having a plurality of reels, said reels including a plurality of symbols including a plurality of predefined award symbols, a trigger symbol and at least one wild symbol, and wherein each of the symbols is associated with a probability of being indicated on a payline associated with said reels;

(b) upon a wager by a player, activating said plurality of reels to randomly generate a plurality of said symbols on said reels; and (c) if the trigger symbol is indicated on the payline, initiating an award mode without requiring any additional wager by the player, wherein the award mode includes:

(i) modifying the probability of being indicated on the payline associated with a plurality of the symbols in the award mode, which includes increasing the probability of being indicated on the payline associated with each of said plurality of predefined award symbols, (ii) activating a decreased number of said plurality of the reels to indicate one of the predefined award symbols in the award mode based on the probabilities, and (iii) providing an award associated with the indicated predefined award symbol to a player.

10. The method of claim 9, which includes increasing the probabilities associated with the predefined award symbols in the award mode by re-activating the activated reels when one or more designated symbols are indicated on the payline.

11. The method of claim 9, which includes increasing the probabilities associated with the predefined award symbols in the award mode by re-activating the activated reels when the trigger symbol is indicated on the payline.

12. The method of claim 9, which is provided through a data network.

13. The method of claim 12, wherein the data network is an internet.

14. A method for operating a gaming device, said method comprising:

(a) providing a base game having a plurality of reels, said reels including a plurality of symbols including a plurality of award symbols, null, symbols, and at least one trigger symbol, and wherein each of a plurality of designated winning symbol combinations is formed by a number of said symbols, each of said plurality of designated winning symbol combinations associated with a probability of being indicated on a payline associated with said reels;

(b) upon a wager by a player, randomly generating a set of symbols from a plurality of symbols on a plurality of reels; and (c) if the trigger symbol is indicated on the payline, initiating an award mode without requiring any additional wager by the player, wherein the award mode includes:

(i) for at least one of said plurality of designated winning symbol combinations, increasing the probability of being indicated on the payline associated with said designated winning symbol combination by decreasing the number of symbols of said designated winning symbol combination which must be indicated in the award mode to provide said designated winning symbol combination, (ii) indicating at least one symbol in the award mode, and (iii) if the at least one indicated symbol provides one of said plurality of designated winning symbol combinations, providing to the player an award associated with said one of the winning symbol combinations.

15. The method of claim 14, which is provided through a data network.

16. The method of claim 15, wherein the data network is an internet.

* * * * *

UNITED STATES PATENT AND TRADEMARK OFFICE

CERTIFICATE OF CORRECTION

PATENT NO. : 7,775,874 B2
APPLICATION NO. : 11/419681
DATED : August 17, 2010
INVENTOR(S) : Ching et al.

It is certified that error appears in the above-identified patent and that said Letters Patent is hereby corrected as shown below:

IN THE CLAIMS:

In Claim 1, Column 13, Line 36, after “reels,” insert --and--.

In Claim 3, Column 14, Line 14, replace “of designated” with --of said designated--.

Signed and Sealed this

Sixteenth Day of November, 2010

David J. Kappos

David J. Kappos
*Director of the United States Patent and Trademark Office*